(12) United States Patent
Oku et al.

(10) Patent No.: US 8,786,887 B2
(45) Date of Patent: Jul. 22, 2014

(54) APPARATUS, SYSTEM, AND METHOD OF LOG MANAGEMENT, AND RECORDING MEDIUM STORING LOG MANAGEMENT PROGRAM

(75) Inventors: Takenori Oku, Saitama (JP); Michihiko Tsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 13/531,771

(22) Filed: Jun. 25, 2012

(65) Prior Publication Data

US 2013/0016393 A1 Jan. 17, 2013

(30) Foreign Application Priority Data

Jul. 14, 2011 (JP) ................. 2011-155313

(51) Int. Cl.
*G06F 3/12* (2006.01)
*G06K 15/00* (2006.01)

(52) U.S. Cl.
USPC .................... 358/1.15; 358/1.16; 358/1.13

(58) Field of Classification Search
CPC ... G06F 3/1273; G06F 3/1232; G06F 3/1224; G06F 3/1226; G06F 3/1231; G06F 3/1239; H04N 2201/3223
See application file for complete search history.

(56) References Cited

U.S. PATENT DOCUMENTS

2006/0048060 A1* 3/2006 Mohr et al. .................. 715/747
2010/0128298 A1* 5/2010 Matsugashita ............... 358/1.13
2011/0295695 A1 12/2011 Ishihara et al.

FOREIGN PATENT DOCUMENTS

JP 2005-222161 A 8/2005
JP 2009-070386 A 4/2009
JP 2010-218064 A 9/2010

* cited by examiner

*Primary Examiner* — Dov Popovici
(74) *Attorney, Agent, or Firm* — Harness, Dickey & Pierce, P.L.C.

(57) ABSTRACT

A log management system stores association data indicating association between program identification information for identifying a program that requests execution of one or more functions at an information processing apparatus, and function identification information for identifying each one of the one or more functions to be executed by the program, receives program identification information for identifying a program that requests the information processing apparatus to execute one or more functions from the information processing terminal on which the program is installed through the network, and obtains function identification information that is associated with the program identification information received from the information processing terminal using the association data.

15 Claims, 11 Drawing Sheets

FIG. 7

ESTIMATED TERMINAL NUMBER MANAGEMENT TABLE

| Device ID | ESTIMATED NUMBER OF TERMINALS |
|---|---|
| A001 | 14 |
| A002 | 14 |
| A003 | 14 |
| A004 | 2 |
| A005 | 2 |
| A006 | 7 |
| ⋮ | ⋮ |

FIG. 8

CUSTOMER INFORMATION MANAGEMENT TABLE

| CUSTOMER ID | DEVICE ID | EMPLOYEE SIZE | BUSINESS TYPE | PENETRATION RATE (%) |
|---|---|---|---|---|
| C001 | A001 | M | UTILITY WORK | 70 |
| C001 | A002 | M | UTILITY WORK | 70 |
| C001 | A003 | M | UTILITY WORK | 70 |
| C002 | A004 | S | OTHER | 50 |
| C002 | A005 | S | OTHER | 50 |
| C003 | A006 | SM | LAW FIRM | 100 |
| C003 | A007 | SM | LAW FIRM | 100 |
| C004 | A008 | ML | ELECTRICAL MACHINERY MANUFACTURER | 40 |
| C004 | A009 | ML | ELECTRICAL MACHINERY MANUFACTURER | 40 |
| C005 | A010 | L | PUBLISHER/PRINTING | 90 |
| C005 | A011 | L | PUBLISHER/PRINTING | 90 |
| C005 | A012 | L | PUBLISHER/PRINTING | 90 |
| C006 | A013 | LL | INTEGRATED INDUSTRIES | 60 |
| C007 | A014 | LL | INTEGRATED INDUSTRIES | 60 |
| C007 | A015 | LL | INTEGRATED INDUSTRIES | 60 |
| ⋮ | ⋮ | ⋮ | ⋮ | ⋮ |

WIDGET MANAGEMENT TABLE

| WIDGET ID | FUNCTION | FUNCTION ID |
|---|---|---|
| W001 | 2-SIDED PRINT | E001 |
| W002 | AGGREGATE PRINT | E002 |
| W003 | 2-SIDED, AGGREGATE PRINT | E001+E002 |
| ⋮ | ⋮ | ⋮ |

APPARATUS, SYSTEM, AND METHOD OF LOG MANAGEMENT, AND RECORDING MEDIUM STORING LOG MANAGEMENT PROGRAM

CROSS-REFERENCE TO RELATED APPLICATIONS

This patent application is based on and claims priority pursuant to 35 U.S.C. §119 to Japanese Patent Application No. 2011-155313, filed on Jul. 14, 2011, in the Japan Patent Office, the entire disclosure of which is hereby incorporated herein by reference.

BACKGROUND

1. Field

The present invention relates to managing log information indicating a log of functions that are executed at an information processing apparatus.

2. Background

The recent image forming apparatuses are provided with various functions including the print function, copy function, fax communication function, scanning function, etc. The image forming apparatuses may send information regarding one or more functions that are executed at the image forming apparatus to a services provider. For example, as illustrated in FIG. 17, an image forming apparatus 10x may send information indicating a number of times each function of the image forming apparatus 10x is executed, to a log management server 30x through the Internet 2I. The services provider providing the services through the image forming apparatus 10x may analyze the obtained log information to generate a report.

SUMMARY

In alternative to instructing the image forming apparatus to execute a specific function using an operation panel provided on the image forming apparatus, a user may select a specific widget that is installed onto a user terminal to cause the user terminal to send an instruction to the image forming apparatus. For example, as illustrated in FIG. 16, a widget may be installed onto a user terminal 20Y, which is connected to an image forming apparatus 10y through a network such as the Internet 2I. The user at the image forming apparatus 10y may select a widget to cause the widget that operates on the user terminal 20y to send an instruction for executing a specific function to the image forming apparatus 10y.

If one or more functions are executed using the widget, the image forming apparatus 10y is not able to provide log information indicating a number of times each function of the image forming apparatus 10y is executed using the widget, to a log management server 30y. Even when the log management server 30y is able to obtain usage information indicating a number of times the widget is used from the user terminal 20y, the log management server 30y is not able to use the usage information to obtain log information indicating a number of times each function of the image forming apparatus 10y is executed, as the widget may execute more than one function of the image forming apparatus 10y.

In view of the above, one aspect of the present invention is to provide a technique of effectively managing log information indicating a log of one or more functions that are executed at the image forming apparatus, even when the functions are executed using the widget.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is an example data structure of an estimated terminal number management table, managed by the log management system of FIG. 6;

FIG. 8 is an example data structure of a customer information management table, managed by a customer information management system of FIG. 1;

Figure 1:
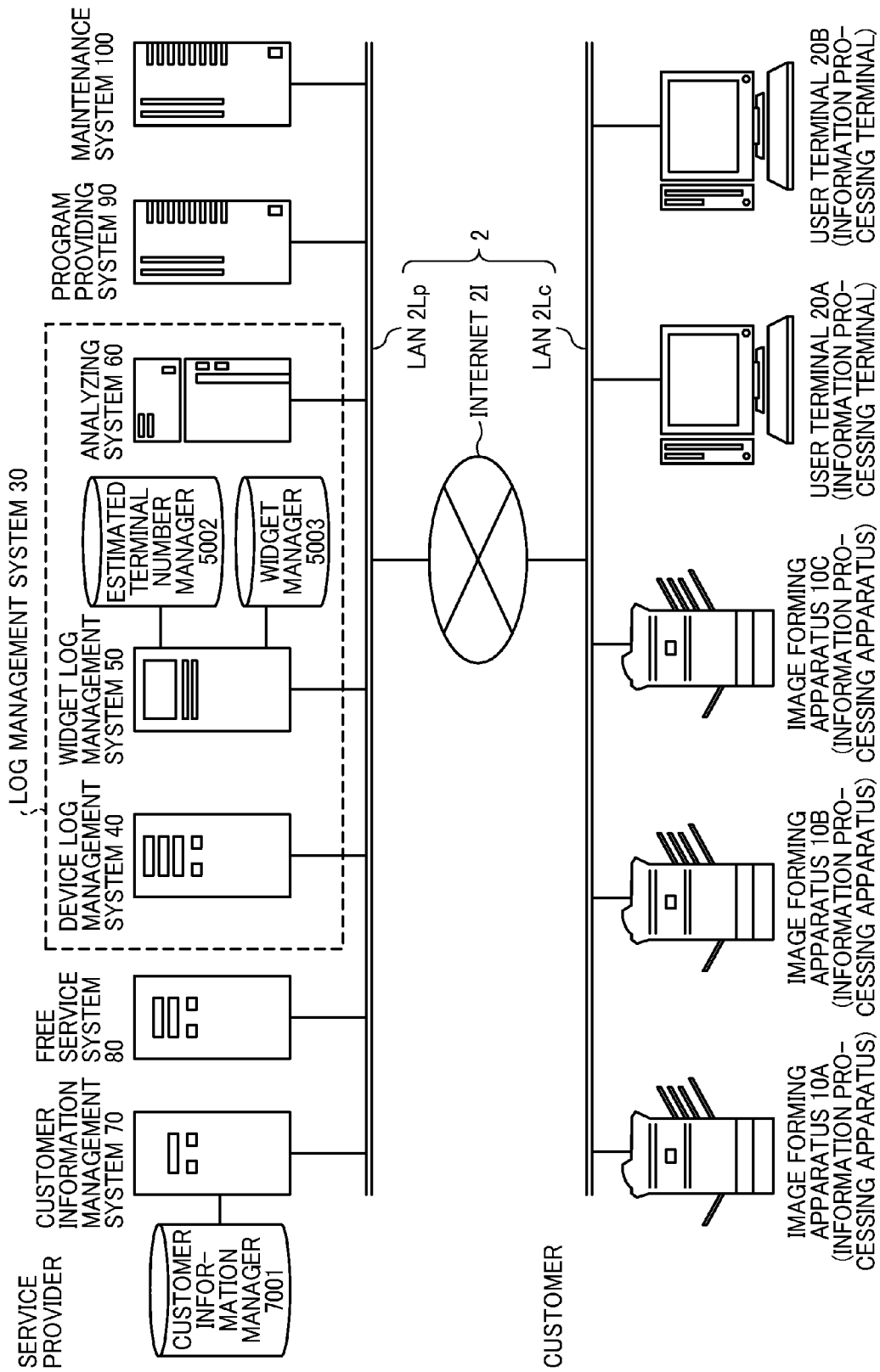
FIG. 1 is an illustration of an image forming system including a log management system, an image forming apparatus, and a user terminal, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 15, example embodiments of the present invention are explained. FIG. 1 illustrates an image forming system including a log management system 30.

The image forming system of FIG. 1 includes a plurality of image forming apparatuses 10A, 10B, and 10C (collectively referred to as the "image forming apparatus 10"), a plurality of user terminals 20A and 20B (collectively referred to as the "user terminal 20"), the log management system 30, a customer information management system 70, a free service system 80, a program providing system 90, and a maintenance system 100. The log management system 30 includes a device log management system 40, a widget log management system 50, and an analyzing system 60.

Any one or any combination selected from the customer information management system 70, free service system 80, program providing system 90, maintenance system 100, device log management system 40, widget log management system 50, and analyzing system 60 may be implemented by one or more computers each performing one or more specific functions.

The image forming apparatus 10 may be implemented by a printer, copier, facsimile, scanner, or a multifunction peripheral (MFP) capable of performing a plurality of image processing and/or image forming functions. The image forming system of FIG. 1 may include an information processing apparatus in addition to or in replace of the image forming apparatus 10, such as a personal computer (PC), or a personal digital assistant (PDA) such as a portable phone, a game machine with communication capability, digital camera with communication capability, watch with communication capability, etc. The PC includes any desired computer including, for example, a notebook, desktop, or tablet. For simplicity, the image forming apparatus 10 is assumed to be one example of the information processing apparatus.

The user terminal 20 may be implemented by any desired information processing apparatus such as a PC, or a personal digital assistant (PDA) such as a portable phone, game machine with communication capability, digital camera with communication capability, watch with communication capability, etc. The PC includes any desired computer including, for example, a notebook, desktop, or tablet. For simplicity, the user terminal 20 is assumed to be one example of an information processing terminal, which functions as a client with respect to the information processing apparatus that is implemented by the image forming apparatus 10.

In the following examples, it is assumed that the image forming apparatus 10 is implemented by a MFP, and the user terminal 20 is implemented by a PC. Alternatively, the image forming apparatus 10 may be replaced with a PC functioning as the image forming apparatus 10, and the user terminal 20 may be implemented by a PC functioning as the user terminal 20.

The user terminal 20 is installed with a widget, which causes the image forming apparatus 10 to perform specific functions when selected by a user. The widget, which may be alternatively referred to as a gadget, is software application and/or user interface that are relatively simple and easy to use. For example, the user may install a widget onto the user terminal 20, which is simple and easy to use as opposed to a complete software package such as word processor or spreadsheet. Using the widget, the user is able to easily cause the image forming apparatus 10 to perform specific functions. Alternatively, the user may develop a widget to be installed onto the user terminal 20.

In the following examples, it is assumed that the image forming apparatus 10 and the user terminal 20 are provided at a user site and managed by the user, i.e., a customer who uses products and services provided by a services provider. The customer may include any organization such as a company, an institution, a government agency, etc. The image forming apparatus 10 and the user terminal 20 are each operated by the user, such as an employee who works for the company or the government agency. For simplicity, the user and the customer may be used interchangeably to indicate an organization, or a person in the organization. Further, the user site, or any image forming apparatus 10 or any user terminal 20, may be located at one or more locations within or outside the country as long as the user site is managed by the user.

The log management system 30, customer information management system 70, free service system 80, program providing system 90, and maintenance system 100 are provided at a services provider site and managed by the services provider. The services provide site, or any apparatus that constitutes the system of the services provider, may be located at one or more locations within or outside the country as long as the services provider site is managed by the services provider. Further, the services provider may include one or more entities. More specifically, in the following examples, the services provider manages and analyzes function execution log data indicating a log of one or more specific functions of the image forming apparatus 10 that are executed in response to a user instruction to generate an analysis result. Based on the analysis result, the services provider provides the user with proposals on how to use the image forming apparatus 10, based on the environment in which the user operates. For example, the services provider informs the user of one or more functions of the image forming apparatus 10 that are rarely or never used by the user. The services provider further teaches the user how to use the functions of the image forming apparatus 10 that are rarely or never used to help the user to utilize more of the functions that are available to the user, thus improving customer satisfaction.

The image forming apparatus 10 and the user terminal 20 are connected through a local area network 2Lc, which is a network provided at the user site. The device log management system 40, widget log management system 50, analyzing system 60, customer information management system 70, free service system 80, program providing system 90, and maintenance system 100 are connected through a LAN 2Lp, which is provided at the services provider site and managed by the services provider. In this example, the communication network 2 includes the Internet 2I, LAN 2Lp, and LAN 2Lc.

The LAN 2Lc and the LAN 2Lp may be implemented by any desired network such as a wireless or wired network, or a combination of wireless and wired network. Alternatively, the device log management system 40, widget log management system 50, analyzing system 60, customer information management system 70, free service system 80, program providing system 90, and maintenance system 100 may be connected through the Internet 2I, directly not through the LAN 2Lp.

The device log management system 40 obtains information regarding a log of various functions that are performed at the image forming apparatus 10, from the image forming apparatus 10 through the communication network 2, and manages the obtained information as function execution log data. The widget log management system 50 includes an estimated terminal number manager 5002 and a widget manager 5003. The widget log management system 50 obtains information regarding a log of widgets that are executed at the user terminal 20 from the user terminal 20 through the communication network 2, and manages the obtained information as widget usage log data. The widget log management system 50 further converts the widget usage log data, to function execution log data indicating a log of functions that are performed at the image forming apparatus 10 in response to the request received from the widget. The analyzing system 60 obtains the function execution log data indicating a log of functions that are executed at the image forming apparatus 10, from the widget log management system 50 through the communication network 2 for analysis to generate an analysis result. For example, the analyzing system 60 obtains the function execution log data that is received from the image forming apparatus 10, and the converted widget usage log data that is generated based on the widget usage log data received from the user terminal 20. The analysis result may indicate how frequently the widget is used in executing one or more functions at the image forming apparatus 10.

The customer information management system 70 includes a customer information manager 7001, which manages customer information regarding the user, i.e., the customer. The free service system 80 provides various services to the image forming apparatus 10 or the user terminal 20 through the communication network 2. Examples of such services include, but not limited to, an optical character recognition (OCR) service, translation service, Web service, and application service provider (ASP) service.

The program providing system 90 distributes various programs for execution to various devices in the image forming system of FIG. 1 such as the image forming apparatus 10, the user terminal 20, the log management system 30, the customer information management system 70, the free service system 80, and the maintenance system 100 of the image forming system through the communication network 2. For example, the program providing system 90 includes a hard disk (HD) 204 (FIG. 3), which stores various control programs for distribution. Alternatively, any portion of the control programs may be written onto a recording medium, such as a CD-ROM, in any format that is installable or executable by a general-purpose computer, for example, to be distributed within or outside the country.

More specifically, in this example, the program providing system 90 may send a widget log management program to one or more server computers to cause the server computers to function as the widget log management system 50. The program providing system 90 may send a device log management program to one or more server computers to cause the server computers to function as the device log management system 40. The program providing system 90 may send an analyzing program to one or more server computers to cause the server computers to function as the analyzing system 60. Any one of the widget log management program, device log management program, and analyzing program may be provided in various ways such as in any desired group of modules, in any desired format, or at any desired time. Further, the widget log management program, device log management program, and analyzing program may be collectively referred to as a log management program that causes one or more computers to provide the services of managing a log of functions performed at the image forming apparatus 10.

The program providing system 90 may send a widget manager program to the user terminal 20 to cause the user terminal 20 to send a user instruction using the widget. Through the widget manager, the user at the user terminal 20 may download any desired widget from the communication network 2 to install the widget onto the user terminal 20.

The maintenance system 100 maintains, manages, or fixes, or upgrades at least one of the image forming apparatus 10, the user terminal 20, the log management system 30 including the device log management system 40, the widget log management system 50, and the analyzing system 60, the customer information management system 70, the free service system 80, and the program providing system 90. Assuming that the maintenance system 100 is provided within a country, and the other systems including the log management system 30 are each provided outside the country, the maintenance system 100 maintains, manages, fixes, or upgrades any part of the other systems, remotely through the communication network 2. For example, the maintenance system 100 may manage the other systems using a machine type number, a manufacturing number, customer information, maintenance and repair information, and failure log information.

<Hardware Structure>

Figure 2:
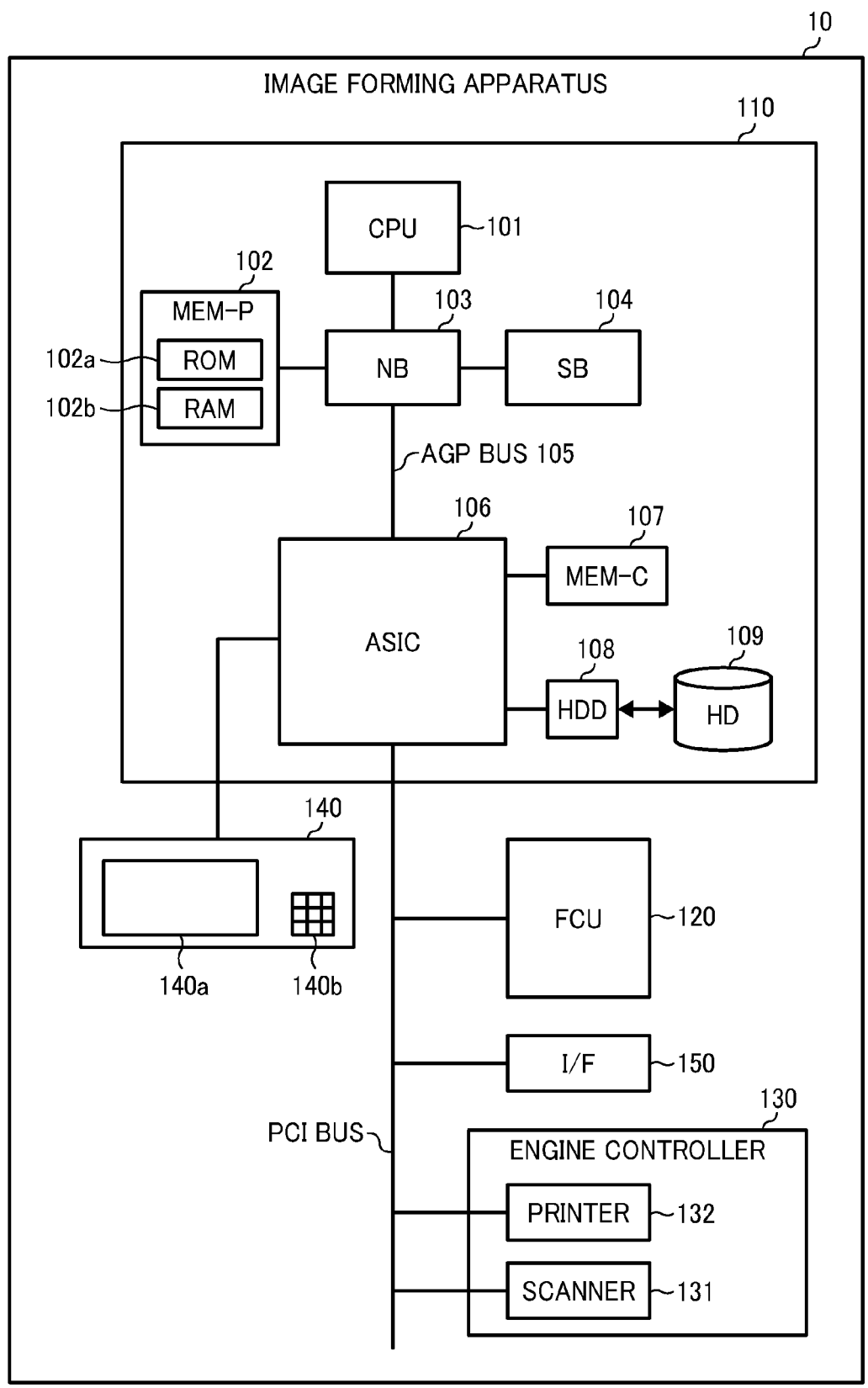
FIG. 2 is a schematic block diagram illustrating a hardware structure of the image forming apparatus of the image forming system of FIG. 1.

Referring now to FIG. 2, a hardware structure of a control section of the image forming apparatus 10 is explained according to an example embodiment of the present invention.

The image forming apparatus 10 includes a controller 110, a facsimile control unit (FCS) 120, an engine controller 130, an operation device 140, and a communication interface 150. The engine controller 130 includes a scanner 131 and a printer 132. The operation device 140, which may be implemented by an operation panel, includes a panel display 140a and operation keys 140b. The panel display 140a, which is implemented by a liquid crystal display with the touch panel function, displays thereon current setting parameter values or a selected screen, or receives a user input from the user. The operation keys 140b include various keys such as a ten key and a start key. The ten key may be used to input numerical values indicating parameter values for various image forming conditions such as density. The start key may be selected by the user to instruct operation such as copying. The controller 110 controls entire operation of the image forming apparatus 10 including, for example, drawing an image, communicating, and receiving user input through the operation device 140. The scanner 131 and the printer 132 are each capable of performing image processing such as error diffusion or gamma conversion.

In this example, the operation device 140 may display a plurality of types of application selection keys. Alternatively, the operation keys 140b may include a plurality of types of application selection keys. The image forming apparatus 10 operates in various modes according to selection that is instructed by the user using the application selection key, which may be displayed or provided on the operation device 140. When a document box key is selected, the image forming apparatus 10 operates in a document box mode to perform the function of storing data in a memory such as a memory of the image forming apparatus 10. When a copy key is selected, the image forming apparatus 10 operates in a copy mode to perform the function of copying an original placed on the image forming apparatus 10. When a print key is selected, the image forming apparatus 10 operates in a print mode to perform the function of printing data to output a printed sheet. When a facsimile key is selected, the image forming apparatus 10 operates in a facsimile mode to perform the function of transmitting data to a destination.

The controller 110 includes a central processing unit (CPU) 101, a system memory (MEM-P) 102, a north bridge (NB) 103, a south bridge (SB) 104, an Application Specific Integrated Circuit (ASIC) 106, a local memory (MEM-C) 107, a hard disk drive (HDD) 108, and a hard disk (HD) 109. The NB 103 and the ASIC 106 are connected through an Accelerated Graphic Port (AGP) bus 105.

The CPU 101 controls entire operation of the image forming apparatus 10. The NB 103 connects the CPU 101 with the MEM-P 102, SB 104, and AGP bus 105. The NB 103 includes a memory controller that controls reading or writing with respect to the MEM-P 102, a peripheral component interconnect (PCI) master, and an AGP target.

The MEM-P 102 includes a read only memory (ROM) 102a and a random access memory (RAM) 102b. The ROM 102a is a nonvolatile memory, which stores therein various programs or data, which cause the controller 110 to execute various functions. The RAM 102b is a volatile memory in which programs or data are deployed, or in which drawing data to be printed is stored. The programs stored in the ROM 102a may be stored in a computer readable recording medium in a format installable or executable for distribution. Examples of the recording medium include, but not limited to, CD-ROM, FD, CD-R, and DVD.

The SB 104 connects the NB 103 with a PCI device and other peripheral devices. The ASIC 106 is an integrated circuit specialized for image processing, which includes various hardware elements that perform image processing. The ASIC 106 functions as a bridge, which connects the AGP bus 105, the PCI bus, the HDD 108, and the MEM-C 107. The ASIC 106 mainly includes a PCI target, an AGP master, an arbiter (ARB), a memory controller that controls the MEM-C 107, a plurality of direct memory access controllers (DMACs), and a PCI unit. The DMACs may perform rotation of image data using a hardware logic. The PCI unit transfers data between the scanner 131 and the printer 132 through the PCI bus. The ASIC 106 is connected to the FCU 120 through the PCI bus. The ASIC 106 may be connected to a universal serial bus (BUS) interface, or an Institute of Electrical and Electronics Engineers (IEEE) 1394 interface.

The MEM-C 107 is a local memory, which may be used as a copy image buffer or a code buffer. The HD 109 stores therein various data such as image data, font data to be used for printing, and form data. The HDD 108 controls reading or writing of data with respect to the HD 109 under control of the CPU 101. The AGP bus 105 is a bus interface applicable to a graphics accelerator card, which is provided to accelerate graphics processing. With direct, high-throughput access to the MEM-P 102, processing using the graphics accelerator card can be performed with increased speeds.

Figure 3:
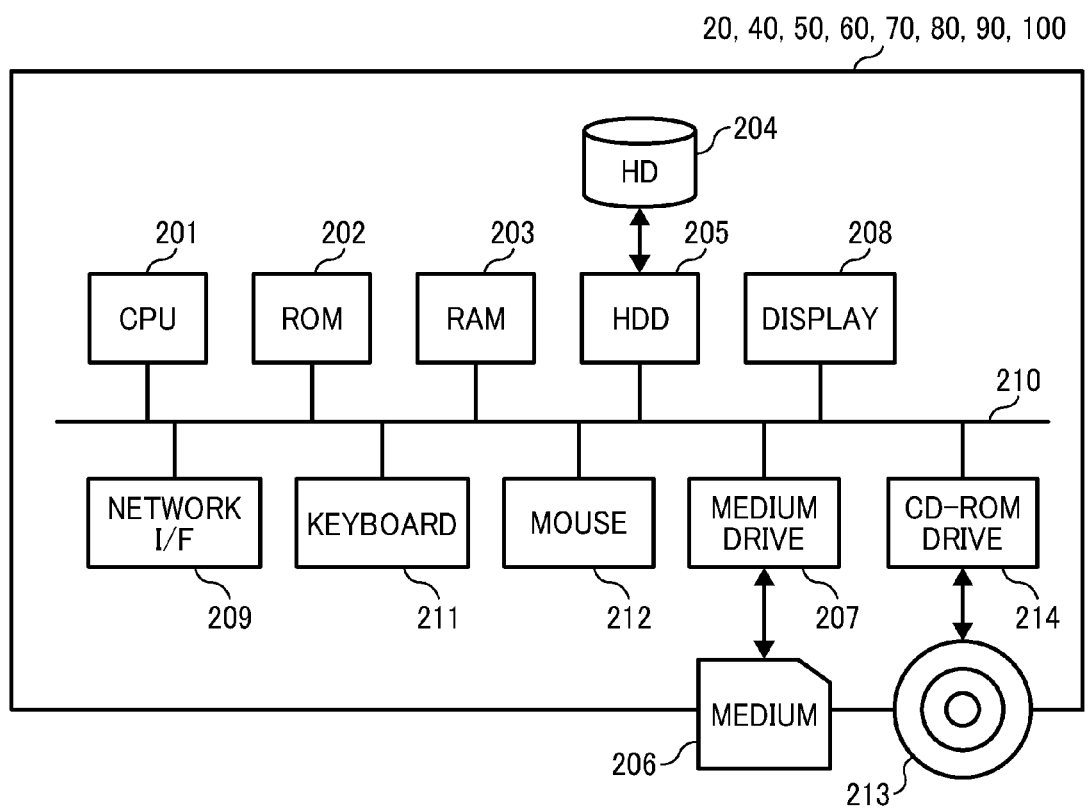
FIG. 3 is a schematic block diagram illustrating a hardware structure of any one of the user terminal and server computers of the image forming system of FIG. 1.

Referring now to FIG. 3, a hardware structure of the user terminal 20 is explained according to an example embodiment of the present invention.

The user terminal 20 includes a CPU 201, a ROM 202, a RAM 203, a HD 204, a HDD 205, a medium drive 207, a display 208, a network I/F 209, a keyboard 211, a mouse 212, and a CD-ROM 214, which are connected through a bus line 210. The CPU 201 controls entire operation of the user terminal 20. The ROM 202 stores therein various programs to be used by the CPU 201 to perform operation such as an initial program loader (IPL). The RAM 203 functions as a work area of the CPU 201. The HD 204 stores therein various data to be used by the CPU 201 in executing various programs. The HDD 205 controls reading or writing of various data with respect to the HD 204 under control of the CPU 201. The medium drive 207 controls reading or writing of data with respect to the recording medium 206 such as a flash memory. The display 208 displays various data or information such as a cursor, menu, window, character, or image to the user. The network I/F 209 transmits to or receives from various data through the communication network 2. The keyboard 211 is provided with a plurality of keys to be selected by the user to input various characters, numerals, or instructions. The mouse 212 allows the user to select or execute various instructions, select a target to be processed, or move the curser on the display 208. The CD-ROM drive 214 controls reading or writing of various data with respect to a CD-ROM 213, which is one example of a removable recording medium. The bus line 210, which is implemented by an address bus or a data bus, electrically connects the above-described devices of the user terminal 20.

In this example, any one of the device log management system 40, the widget log management system 50, the analyzing system 60, the customer information management system 70, the free service system 80, the program providing system 90, and the maintenance system 100 may be each or collectively implemented by one or more computers having a hardware structure described above referring to FIG. 3.

Figure 4:
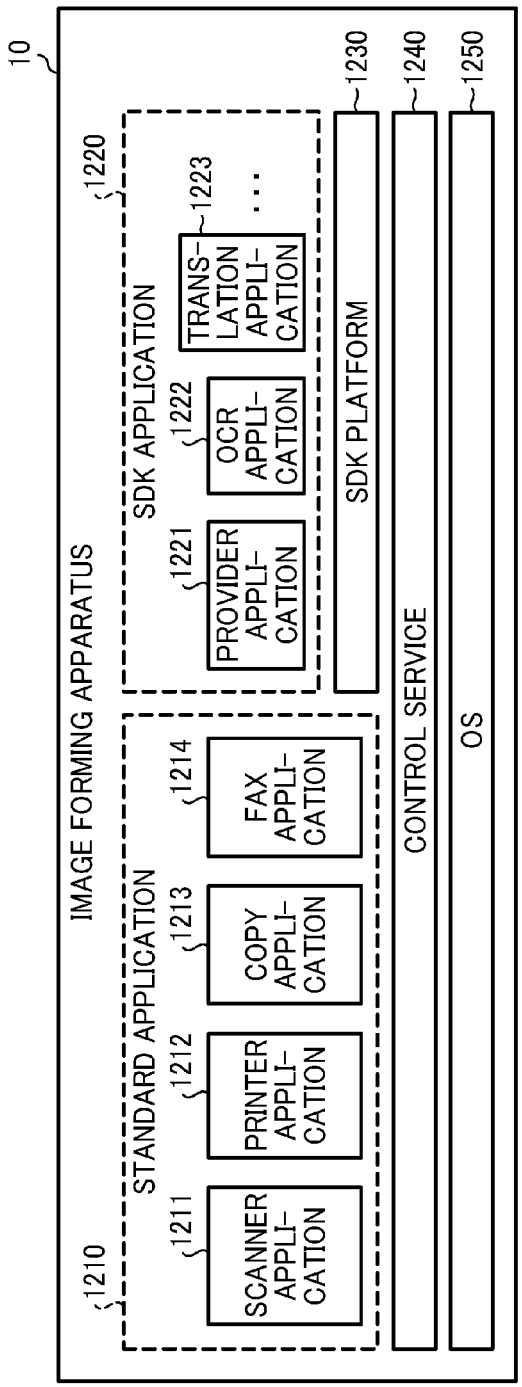
FIG. 4 is a schematic block diagram illustrating a software structure of the image forming apparatus of the image forming system of FIG. 1.

Referring now to FIG. 4, a software structure of the image forming apparatus 10 is explained according to an example embodiment of the present invention.

The image forming apparatus 10 includes standard application 1210, software development kit (SDK) application 1220, a SDK platform 1230, a control service 1240, and an operating system (OS) 1250. The standard application 1210 is a collection of application that is installed onto the image forming apparatus 10 by default before being shipped to the customer. In this example illustrated in FIG. 4, the standard application 210 includes scanner application 1211, print application 1212, copy application 1213, and facsimile ("fax") application 1214. The scanner application 1211 executes a scan job. The print application 1212 executes a print job. The copy application 1213 executes a copy job. The facsimile application 1214 executes a facsimile transmission job or a facsimile reception job. The control service 1240 is a collection of software modules that provide upper layer application with various functions to be used for controlling various hardware resources. Examples of various functions to be provided by the software modules include, but not limited to, network communication function, scanner control function, printer control function, and memory management function.

The SDK application 1220 is any application that is additionally installed onto the image forming apparatus 10 after it is shipped to the customer, as a plug-in so as to extend the functions of the image forming apparatus 10. In this example illustrated in FIG. 4, the SDK application 1220 includes provider application 1221, optical character reader (OCR) application 1222, and translation application 1223, etc. The provider application 1221 executes processing that allows the user to operate the widget 21 through the image forming apparatus 10. The OCR application 1222 executes OCR processing. The translation application 1223 executes translation processing.

The SDK platform 1230 provides an environment in which the SDK application 1220 can be executed on the image forming apparatus 10. The SDK application 1220 is developed using an application program interface (API) provided by the SDK platform 1230. For example, the SDK Platform 1230 provides the SDK application 1220 with an interface to be used by the scanner function, an interface to be used by the print function, and an interface to be used by the copy function, etc. The API of the SDK platform 1230 is made public such that any third vendor may develop the SDK application 1220 using the API. The OS 1250 allows software installed onto the image forming apparatus 10 to operate on the OS 1250 as a process or a thread.

Figure 5:
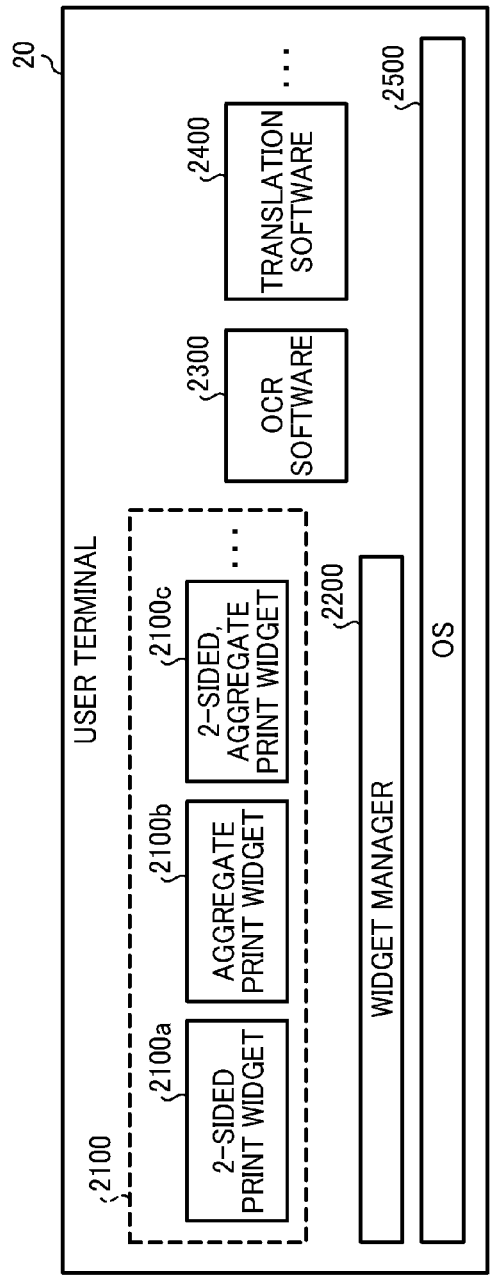
FIG. 5 is a schematic block diagram illustrating a software structure of the user terminal of the image forming system of FIG. 1.

Referring now to FIG. 5, a software structure of the user terminal 20, when the user terminal 20 is installed with a widget manager and a widget, is explained according to an example embodiment of the present invention.

The user terminal 20 includes a widget 2100, a widget manager 2200, OCR software 2300, translation software 2400, and an operating system (OS) 2500. The widget 2100 includes a double-sided ("2-sided") print widget 2100a, an aggregate print widget 2100b, and a 2-sided, aggregate print widget 2100c.

The widget manager 2200 and any one of the widgets 2100 may be downloaded from the communication network 2, such as from the program providing system 90, to be installed onto the user terminal 20. Alternatively, the user at the user terminal 10 may create a widget 2100.

The widget 2100 uses services, which are provided by the user terminal 20 or are available through the communication network 2, to perform specific functions such as a sequence of processes that may be referred to as a work flow. More specifically, the 2-sided print widget 2100a causes the user terminal 20 to send an instruction to instruct the image forming apparatus 10 to print a document image generated at the user terminal 20 onto both sides of a recording sheet. The aggregate print widget 2100b causes the user terminal 20 to send an instruction to instruct the image forming apparatus 10 to print two or more pages of a document image generated at the user terminal 20 on one page of recording sheet. The 2-sided, aggregate print widget 2100c causes the user terminal 20 to send an instruction to instruct the image forming apparatus 10 to print two or more pages of a document image generated at the user terminal 20 on one page of recording sheet, while performing double-sided printing.

The widget manager 2200 functions as a framework of the widget 2100, which relays communication between the widget 2100 installed at the user terminal 20 and the image forming apparatus 10. The widget 2100 is made in compliance with an interface or a processing rule as specified by the widget manager 2200. The widget 2100 thus operates in cooperation with the widget manager 2200.

The OCR software 2300 executes OCR function. In this example, any desired OCR software 2300 that is publicly available may be installed. The OCR software 2300 provides the OCR service to the widget 2100, for example, through interprocess communication. The translation software 2400 executes translation function. In this example, any desired translation software 2400 that is publicly available may be installed. The translation software 2400 provides the translation service to the widget 2100, for example, through interprocess communication. The OS 2500 allows software installed onto the user terminal 20 to operate on the OS 2500 as a process or a thread.

Figure 6:
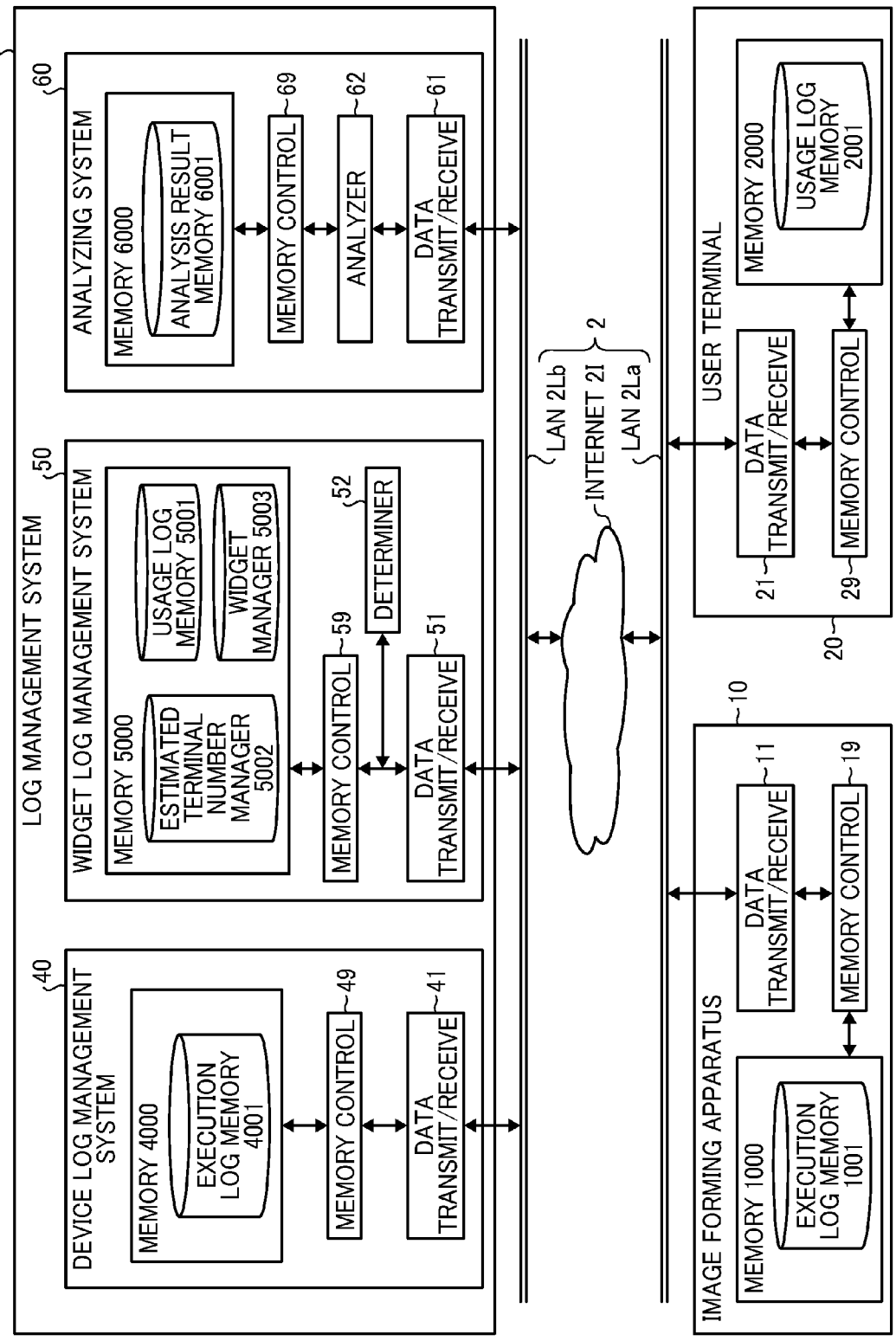
FIG. 6 is a schematic block diagram illustrating a functional structure of the image forming apparatus, user terminal, and log management system of the image forming system of FIG. 1.

Referring now to FIG. 6, a functional structure of a selected portion of the image forming system of FIG. 1 is explained according to an example embodiment of the present invention. For the descriptive purposes, the functional structure of FIG. 6 shows a portion of the image forming system of FIG. 1, which is related to management and analysis of function execution log data indicating one or more functions that have been executed at the image forming apparatus 10.

<Functional Structure of Image Forming Apparatus>

The functional elements or modules of the image forming apparatus 10, which are shown in FIG. 6, are implemented by hardware devices of the image forming apparatus 10 that are shown in FIG. 2 in cooperation with a plurality of instructions generated by the CPU 101 according to a control program stored in the ROM 102a. For example, the image forming apparatus 10 may be installed with a control program that allows the image forming apparatus 10 to perform processing that is instructed using the widget. More specifically, the image forming apparatus 10 includes a data transmit/receive 11, a memory control 19, and a memory 1000. The memory 1000, which is implemented by the HD 109 (FIG. 2), includes an execution log memory 1001, which stores information regarding a log of one or more functions that are performed at the image forming apparatus 10.

The data transmit/receive 11 of the image forming apparatus 10, which may be implemented by the communication I/F 150 (FIG. 2), transmits or receives various data or information to or from the other terminal, device, apparatus, or system through the communication network 2.

The memory control 19, which may be implemented by the HDD 108 (FIG. 2), stores various data or information in the memory 1000 or read out various data or information from the memory 1000. Examples of data stored in the memory 1000 include, but not limited to, identification information for identifying the image forming apparatus 10 having the memory 1000, such as a device ID that is uniquely assigned to the image forming apparatus 10. The memory control 19 stores a function ID for identifying a function that is executed at the image forming apparatus 10, and a number of executions (a number of jobs) the function specified by the function ID has been executed, in association with each other in the execution log memory 1001. In this example, different function IDs are assigned to the double-sided printing function and the aggregate printing function, respectively, even through they may be both performed to output a printed sheet. For example, if the image forming apparatus 10 prints two or more pages of image data onto one recording sheet, while performing the double-sided printing, a number of jobs for the double-sided printing function and a number of jobs for the aggregate printing function are each incremented by one. In addition to or in alternative to the double-sided printing function and the aggregate printing function, any desired functions may be managed using the function ID including, for example, OCR function, translation function, and stapler function.

<Functional Structure of User Terminal>

The functional elements or modules of the user terminal 20, which are shown in FIG. 6, are implemented by hardware devices of the user terminal 20 that are shown in FIG. 3 in cooperation with a plurality of instructions generated by the CPU 201 according to a control program stored in the ROM 202. As described above referring to FIG. 5, the user terminal 20 may be installed with the widget manager 2200 and the widget 2100 that allow the user terminal 20 to send an instruction to the image forming apparatus 10 using the widget. More specifically, the user terminal 20 includes a data transmit/receive 21, a memory control 29, and a memory 2000.

The memory 2000, which may be implemented by the HD 204 (FIG. 3), includes a usage log memory 2001, which stores information regarding one or more widgets that have been used.

The data transmit/receive 21 of the user terminal 20, which may be implemented by the network I/F 209 (FIG. 3), transmits or receives various data or information to or from the other terminal, device, apparatus, or system through the communication network 2.

The memory control 29, which may be implemented by the HDD 205 (FIG. 3), stores various data in the memory 2000 or read out various data from the memory 2000. Examples of data stored in the memory 2000 include, but not limited to, identification information for identifying the user terminal 20 having the memory 2000, such as a terminal ID that is uniquely assigned to the user terminal 20. The memory control 29 stores a widget ID for identifying a widget that is selected at the user terminal 20, a device ID for identifying the image forming apparatus 10 that is caused to execute a specific function by the widget specified by the widget ID, and the date/time at which the widget is selected, in association with one another in the usage log memory 2001.

In this example, any one of the device ID and the terminal ID includes any type of identification information that can be expressed by any language, character, symbol, and mark, or any combination of language, character, symbol, and mark.

<Functional Structure of Log Management System>

The log management system 30 includes the device log management system 40, the widget log management system 50, and the analyzing system 60. The functional elements or modules of the device log management system 40, the widget log management system 50, and the analyzing system 60, which are shown in FIG. 6, are each implemented by hardware devices of any desired number of server computers that are shown in FIG. 3, in cooperation with a plurality of instructions generated by the CPU 201 according to a control program stored in the ROM 202. For example, the device log management system 40 may be installed with the device log management program to have structures shown in FIG. 6. The widget log management system 50 may be installed with the widget log management program to have structures shown in FIG. 6. The analyzing system 60 may be installed with the analyzing program to have structures shown in FIG. 6.

(Functional Structure of Device Log Management System)

The device log management system 40 includes a data transmit/receive 41, a memory control 49, and a nonvolatile memory 4000. The memory 4000, which may be implemented by the HD 204 (FIG. 3), includes an execution log memory 4001, which stores execution log data that is generated based on the execution log data transmitted from the image forming apparatus 10 through the communication network 2.

The data transmit/receive 41 of the device log management system 40, which may be implemented by the network I/F 209 (FIG. 3), transmits or receives various data or information to or from the other terminal, device, apparatus, or system through the communication network 2. For example, the data transmit/receive 41 transmits any number of entries of the execution log data that are extracted from the memory 4000 to the widget log management system 50 or the analyzing system 60.

The memory control 49, which may be implemented by the HDD 205 (FIG. 3), writes various data to or reads various data from the memory 4000, such as the execution log data.

(Functional Structure of Widget Log Management System)

The widget log management system 50 includes a data transmit/receive 51, a determiner 52, a memory control 59, and a nonvolatile memory 5000. In this example, the memory 5000 may be implemented by an internal memory such as the HD 204 (FIG. 3), or any database server having a memory as illustrated in FIG. 1. The memory 5000 includes a usage log memory 5001, which stores usage log data that is generated based on the usage log data transmitted from the user terminal 20 through the communication network 2.

(Estimated Terminal Number Management Table)

The memory 5000 further includes an estimated terminal number manager 5002, which stores therein an estimated terminal number management table of FIG. 7. The estimated terminal number manager 5002 manages identification information for identifying the image forming apparatus 10, and an estimated number of user terminals that are predicted to use services provided by the image forming apparatus 10. For example, the estimated terminal number management table of FIG. 7 stores a device ID of the image forming apparatus 10, and an estimated number of the user terminals 20 that are predicted to be connected to the image forming apparatus 10 specified by the device ID, in association with each other. For example, the estimated terminal number management table of FIG. 7 indicates that a number of user terminals 20 that are predicted to be connected to the image forming apparatus 10 having the device ID "A001" is "14".

Referring now to FIG. 8, operation of calculating an estimated number of user terminals 20 that are predicted to use services provided by the image forming apparatus 10 is explained according to an example embodiment of the present invention. FIG. 8 is an example customer information management table, which is managed by the customer information management system 70.

The customer information management table of FIG. 8 is prepared by the services provider, who provides the customer with various services related to the image forming apparatus 10. For example, the services provider may manage customer information related to the customer, when the services provider sells or leases the image forming apparatus 10 to the customer. The customer information management table of FIG. 8 may be managed by the customer information manager 7001 of the customer information management system 70, which may be implemented by a database server. The customer information management table of FIG. 8 stores a customer ID for identifying a customer, the device ID of the image forming apparatus 10 sold to or leased to the customer, an employee size of the customer, a business type of the customer, and a penetration rate indicating an average number of users (employees) who is assigned with his or her own user terminal 10. The penetration rate of the customer, expressed in percentage, is obtained based on a number of employees and a business type of the customer.

The employee size, or the number of employees who works, is expressed by rank or level. The employee size "S" indicates that the number of employees is from 1 to 4 persons. The employee size "SM" indicates that the number of employees is from 5 to 9 persons. The employee size "M" indicates that the number of employees is from 10 to 29 persons. The employee size "ML" indicates that the number of employees is from 30 to 99 persons. The employee size "L" indicates that the number of employees is from 100 to 299 persons. The employee size "LL" indicates that the number of employees is 300 persons or greater. The penetration rate indicates an estimated average number of user terminals 10 used by one user with respect to a number of employees, which is obtained by business type. The penetration rate is calculated based on statistical data.

The estimated terminal number management table of FIG. 7 is generated using the employee size and the penetration rate that are obtained from the customer information management table of FIG. 8. For example, for the customer having 10 employees with the penetration rate of 70% is predicted to have a number of user terminals 10 that is calculated using the equation: 10*70%=7.

(Widget Management Table)

Figures 9, 10:
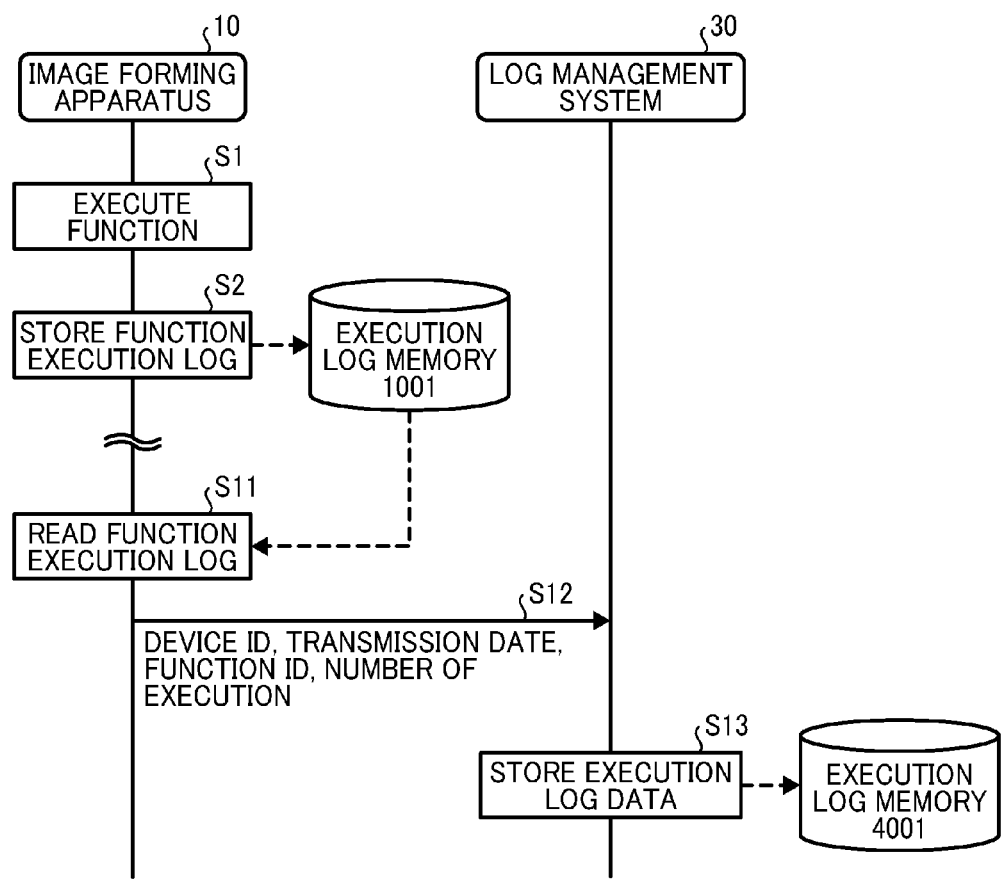
FIG. 9 is an example data structure of a widget management table, managed by the log management system of FIG. 6.
FIG. 10 is a data sequence diagram illustrating operation of managing execution log data indicating a log of functions executed at the image forming apparatus without using a widget, performed by the image forming system of FIG. 1, according to an example embodiment of the present invention.

The memory 5000 further includes the widget manager 5003, which includes a widget management table of FIG. 9. The widget management table of FIG. 9 stores a widget ID of a widget, information indicating one or more specific functions to be executed by the image forming apparatus 10 when the widget having the widget ID is selected, and a function ID for identifying each one of the one or more specific functions to be executed by widget, in association with one another. The widget ID is uniquely assigned to a widget, for example, when the widget is generated.

For example, the widget specified by the widget ID "W001" causes the image forming apparatus 10 to execute the function of double-sided printing that is assigned with the function ID "E001". The widget specified by the widget ID "W002" causes the image forming apparatus 10 to execute the function of aggregate printing that is assigned with the function ID "E002". The widget specified by the widget ID "W003" causes the image forming apparatus 10 to execute the function of double-sided printing that is assigned with the function ID "E001" and the function of aggregate printing that is assigned with the function ID "E002". In addition to or in alternative to the widgets illustrated in FIG. 9, any desired widget may be managed by the widget manager 5003, for example, including a widget that causes the image forming apparatus 10 to perform OCR processing and translation, and a widget that causes the image forming apparatus to perform post processing such as stapling. Examples of widget are described in, for example, U.S. Patent Application Publication No. 2011295695A1, the entire contents of which are hereby incorporated herein by reference.

Example Operation

Referring now to FIGS. 10 to 15, operation of managing information indicating a log of functions that are performed at the image forming apparatus 10, performed by the image forming system of FIG. 1, is explained according to an example embodiment of the present invention.

Figure 11:
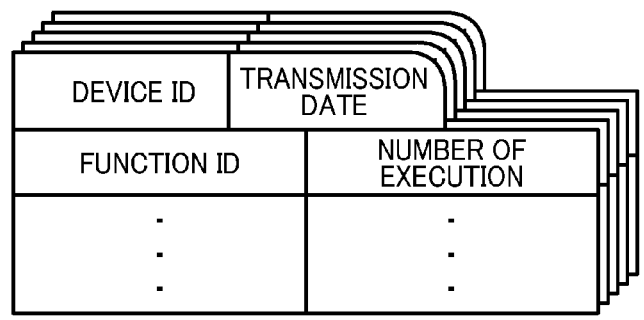
FIG. 11 is an example data structure of execution log data, managed by the log management system of FIG. 6.

Referring to FIGS. 10 and 11, operation of obtaining and managing a log of one or more functions that are performed at the image forming apparatus 10 without using the widget, performed by the image forming apparatus 10 and the log management system 30, is explained according to an example embodiment of the present invention. FIG. 10 is a data sequence diagram illustrating operation of obtaining and managing execution log data. FIG. 11 is an example data structure of execution log data.

At S1, the user at the image forming apparatus 10 or the user terminal 20 causes the image forming apparatus 10 to execute one or more functions. For example, the user may instruct the image forming apparatus 10 to perform the copy operation through the operation device 140. The copy operation may include a double-sided copy function and/or an aggregate copy function. In another example, the user may cause the user terminal 20 to send a printing job including electronic data to the image forming apparatus 20 to print an image of the electronic data on a recording sheet. The print operation may include a double-sided printing function and/ or an aggregate printing function.

At S2, the memory control 19 of the image forming apparatus 10 stores execution log data indicating a log of functions that are executed, in the execution log memory 1001. More specifically, the memory control 19 stores a function ID that identifies a specific function that is performed at the image forming apparatus 10, and a number of which the function specified by the function ID is executed ("number of execution"). For example, when the double-sided printing function is performed, the memory control 19 stores a function ID "E001" of the double-sided printing function with a counter value "1" indicating a number of jobs. In case the function ID "E001" of the double-sided printing function is already registered in a table of the execution log memory 1001, the memory control 19 updates a number of jobs in the "number of execution" field that is associated with the function ID "E001".

S1 and S2 may be performed every time the function is executed at the image forming apparatus 10 such that information indicating a log of executed functions is accumulated in the execution log memory 1001 of the image forming apparatus 10.

At S11, the memory control 19 of the image forming apparatus 10 reads out the accumulated execution log data from the execution log memory 1001 at any desired time. For example, the image forming apparatus 10 may be programmed to read out the execution log data periodically, for example, once per month. In another example, the image forming apparatus 10 may read out the execution log data in response to a request received from the log management system 30. The execution log data includes, for each data entry, the function ID for identifying a specific function, and a number of which the specific function is executed ("number of execution"). The memory control 19 further reads out the device ID for identifying the image forming apparatus 10 from the memory.

At S12, the data transmit/receive 11 transmits the execution log data including a function ID and a number of execution ("a number of jobs") for each function that is performed, the device ID of the image forming apparatus 10, and data indicating the current date and time, to the device log management system 40 of the log management system 30 through the communication network 2. The execution log data transmitted from the image forming apparatus 10 is received at the data transmit/receive 41 of the device log management system 40.

At S13, the memory control 49 of the device log management system 40 stores the execution log data, which is received at the data transmit/receive 41, in the execution log memory 4001 of the memory 4000.

For example, as illustrated in FIG. 11, the execution log memory 4001 stores, for each entry of a device ID of the image forming apparatus 10 ("sender") that sends the execution log data and a transmission date/time of the execution log data, a plurality of function IDs each identifying a specific function executed at the sender and a number of which the specific function is executed.

With the execution log data stored in the execution log memory 4001, the services provider can obtain information regarding a specific customer who has used a specific function of the image forming apparatus 10 at a specific date/time. Using this information, the services provider is able to identify one or more functions that are rarely used or never used by the specific customer, and provides such information to the customer to encourage the customer to use such functions.

The image forming apparatus 10, however, is not capable of obtaining execution log data indicating one or more functions that are executed at the image forming apparatus 10 in response to an instruction received from the widget 2100 installed on the user terminal 20. Such information regarding one or more functions that are executed using the widget is obtained, based on usage log data that is obtained as described below referring to FIGS. 12 to 14.

Figure 12:
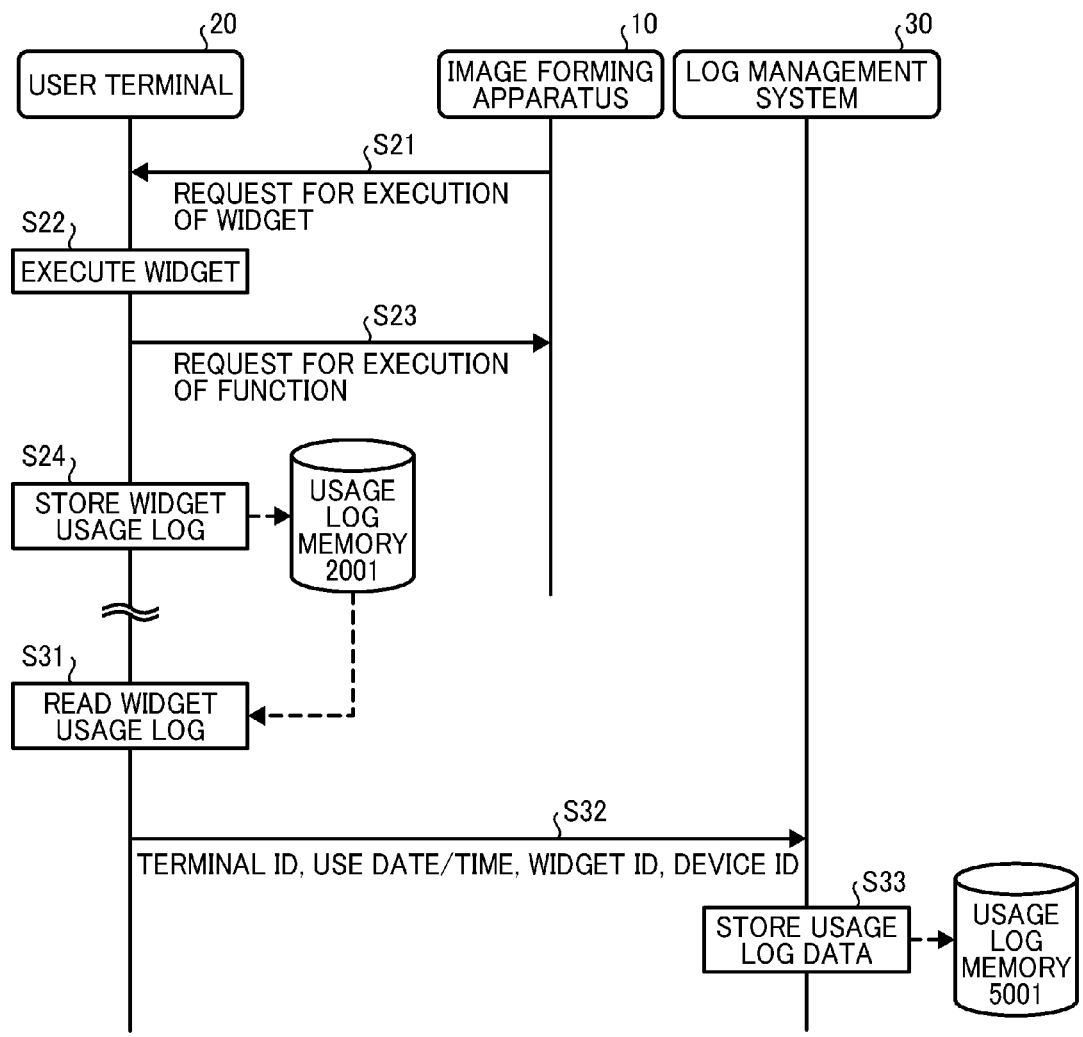
FIG. 12 is a data sequence diagram illustrating operation of managing usage log data indicating a log of widgets selected by the user to execute one or more functions at the image forming apparatus, performed by the image forming system of FIG. 1, according to an example embodiment of the present invention.
Figure 13:
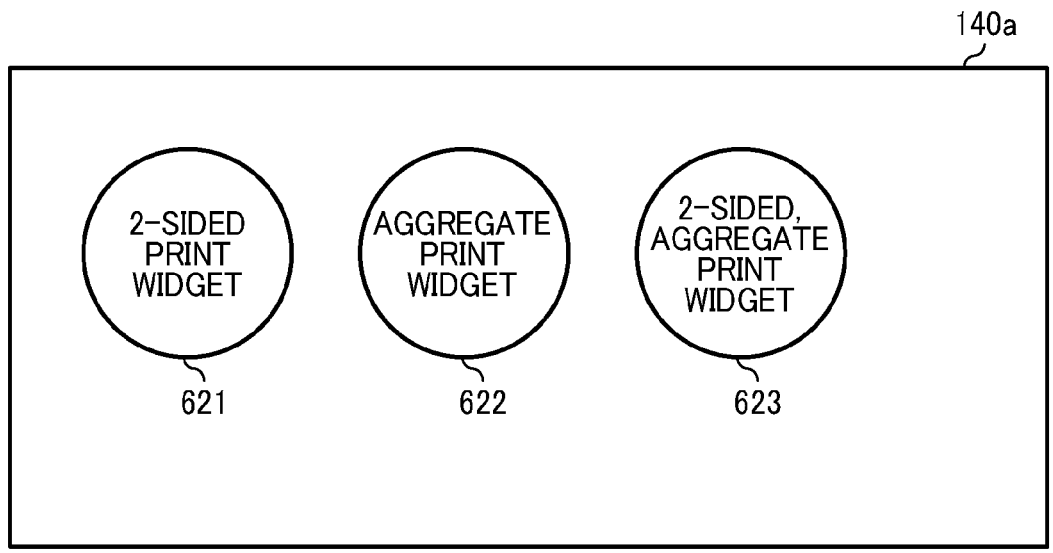
FIG. 13 is an illustration of widget icons, which are displayed at the image forming apparatus or the user terminal.
Figure 14:
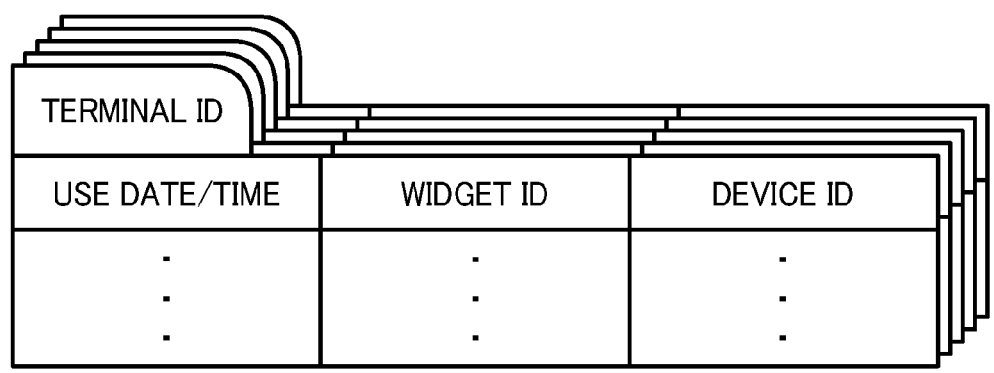
FIG. 14 is an example data structure of usage log data, managed by the log management system of FIG. 6.

Referring now to FIGS. 12 to 14, operation of obtaining and managing a log of one or more widgets that are selected by the user, performed by the image forming apparatus 10, the user terminal 20, and the log management system 30, is explained according to an example embodiment of the present invention. FIG. 12 is a data sequence diagram illustrating operation of obtaining and managing usage log data. FIG. 13 is an illustration of widget icons, which are displayed at the image forming apparatus 10 or the user terminal 20. FIG. 14 is an example data structure of usage log data.

In one example operation, as illustrated in FIG. 13, the display 208 of the user terminal 20 may display icons of the widgets 2100 that are installed at the user terminal 20. In this example, a 2-sided print widget icon 621, an aggregate print widget icon 622, and a 2-sided, aggregate print widget icon 623 are displayed. The user at the user terminal 20 may select one of the widgets 2100, for example, through a print dialog, to cause the user terminal 10 to instruct the image forming apparatus 20 to print image data using the selected widget 2100. The user, after moving to a location at which the image forming apparatus 20 is provided, causes the operation device 140 of the image forming apparatus 10 to display at least an icon of the selected widget 2100 on the panel display 140a. The user at the image forming apparatus 10 selects the icon of the widget 2100 that is displayed on the panel display 140a. The data of the widget icons 621, 622, and 623 are previously installed in a memory of the image forming apparatus 10 and a memory of the user terminal 20.

In another example operation, as illustrated in FIG. 13, the operation device 140 of the image forming apparatus 10 may display icons of the widgets 2100 for selection by the user. The user at the image forming apparatus 10 selects one of the widget icons 621, 622, and 623 that are displayed on the panel display 140a.

At S21, the operation device 140 inputs a user instruction indicating the selected widget to the controller 110 (FIG. 2). The controller 110 (FIG. 2) causes the communication I/F 150, which functions as the data transmit/receive 11, to send a request for executing the selected widget to the user terminal 20 through the communication network 2. The data transmit/receive 21 of the user terminal 20 receives the request for executing the widget selected by the user.

At S22, the user terminal 20 executes the selected widget in response to the request received at S21.

At S23, the data transmit/receive 21 sends a request for executing one or more functions of the image forming apparatus 20 that correspond to the selected widget, to the image forming apparatus 20 through the communication network 2. The image forming apparatus 10, which receives the request for executing specific functions specified by the selected widget, executes the specific functions.

For example, assuming that the user selects the 2-sided print widget icon 621 of FIG. 13, the 2-sided print widget 2100a of the user terminal 20 sends a request for executing the function of double-sided printing, to the image forming apparatus 10. According to the request, the printer application 1212 (FIG. 4) of the image forming apparatus 10 starts printing image data on both sides of a recording sheet.

At S24, the memory control 29 of the user terminal 20 stores widget usage log data indicating a log of widgets that are selected to execute one or more specific functions of the image forming apparatus 10, in the usage log memory 2001. More specifically, the memory control 29 of the user terminal 20 stores a widget ID for identifying the widget 2100 for execution at S22, a device ID of the image forming apparatus 10 that executes the functions specified by the widget, and the date/time of which the widget is used.

S21 to S24 may be performed every time the widget is selected by the user such that information indicating a log of selected widgets is accumulated in the usage log memory 2001 of the user terminal 20.

At S31, the memory control 29 of the user terminal 20 reads out the accumulated usage log data from the usage log memory 2001 at any desired time. For example, the user terminal 20 may be programmed to read out the usage log data periodically, for example, once per day. In another example, the user terminal 20 may read out the usage log data in response to a request received from the log management system 30. The usage log data includes, for each data entry, the date/time of which a widget is used, a widget ID for identifying a widget being used, and a device ID for identifying the image forming apparatus 10 to which the request is sent by the widget. The memory control 29 of the user terminal 20 further reads out a terminal ID for identifying the user terminal 20 from the memory 2000.

At S32, the data transmit/receive 21 of the user terminal 20 transmits the usage log data including the usage data/time, the widget ID of the selected widget, and the device ID of the image forming apparatus 10, and the terminal ID of the user terminal 10, to the widget log management system 50 of the log management system 30 through the communication network 2. The usage log data transmitted from the user terminal 20 is received at the data transmit/receive 51 of the widget log management system 50.

At S33, the memory control 59 of the widget log management system 50 stores data including the usage log data, which is received at the data transmit/receive 51, in the usage log memory 5001 of the memory 5000.

For example, as illustrated in FIG. 14, the usage log memory 5001 stores, for a terminal ID of the user terminal 20 ("sender") that sends the usage log data, a plurality of usage dates/times each indicating the date/time at which the sender uses a widget, a widget ID of the widget being used, a device ID of the image forming apparatus 10 that performs functions that correspond to the widget, in association with one another.

Referring to the usage log data, a number of which a specific widget is used is indicated in number of records. When the widget executes one job, the value indicating a number of records in the usage log data is increased by one. The usage log data of FIG. 14 does not include a data field indicating a number of processes, or a number of executions, of each one of the functions that are performed.

Figure 15:
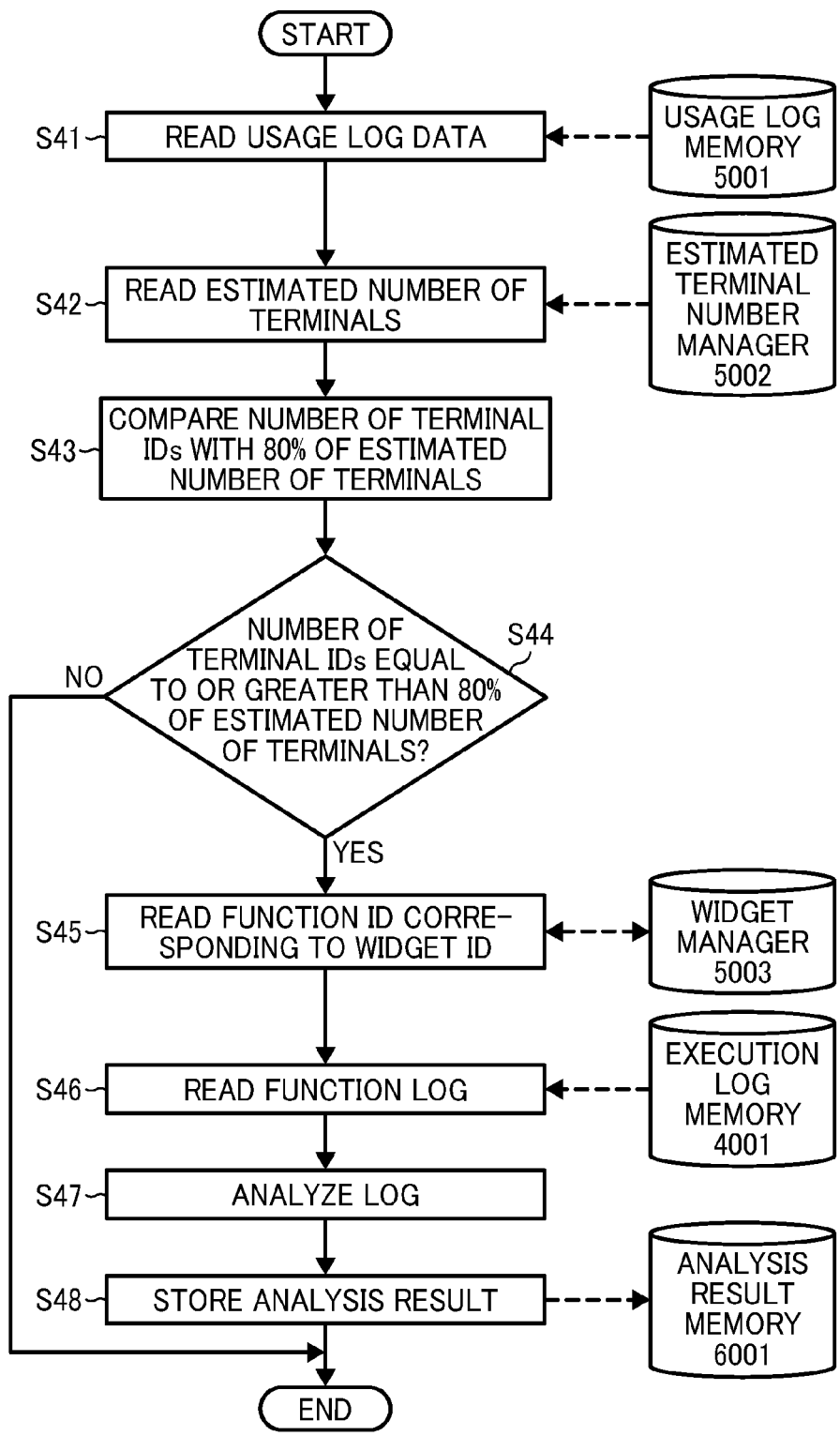
FIG. 15 is a flowchart illustrating operation of analyzing the execution log data and the usage log data, performed by the log management system of FIG. 6, according to an example embodiment of the present invention.
Figure 16:
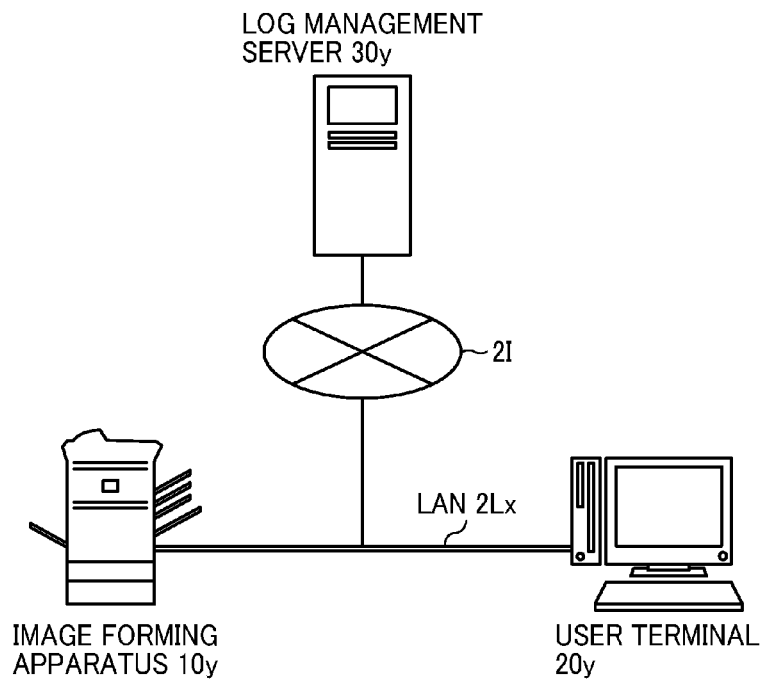
FIG. 16 is an illustration of an image forming system including an image forming apparatus, a user terminal, and a log management server, according to an example embodiment of the present invention.
Figure 17:
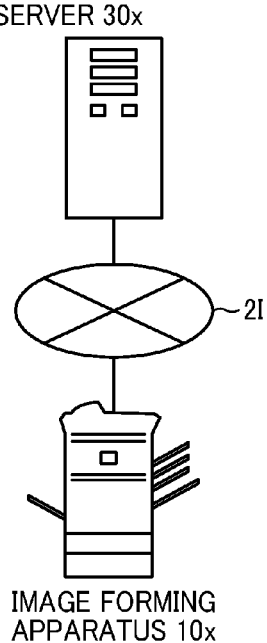
FIG. 17 is an illustration of a background image forming system including an image forming apparatus and a log management server.

Referring now to FIG. 15, operation of analyzing the usage of widget by customer based on the execution log data and the usage log data, performed by the log management system 30, is explained according to an example embodiment of the present invention.

As described above, the services provider compares between a number of functions that are executed at the image forming apparatus 10 without using the widget, and a number of functions that are executed at the image forming apparatus 10 using the widget, to determine whether a specific widget is utilized by a specific customer to perform specific function at a specific image forming apparatus 10. If the specific widget is frequently used to perform specific functions, the services provider may propose the other customers, probably the customers of the same business type, to install and use the specific widget. Further, based on the analysis result, the services provider is able to determine whether installation of the widget, or the use of the widget, increases the usage of specific functions at the image forming apparatus 10.

While the image forming apparatus 10 keeps a log of one or more functions that are executed at the image forming apparatus 10 according to a user instruction as described above referring to FIG. 10, the image forming apparatus 10 is not capable of keeping a log of one or more functions that are executed at the image forming apparatus 10 using the widget. In order to keep a log of one or more functions that are executed using the widget, the user terminal 20 is caused to send the widget usage log data to the log management system 30. However, since the usage log data managed by the user terminal 20 is managed in terms of widget ID, the usage log data needs to be converted to data having a format that is similar to the execution log data managed by the image forming apparatus 10. More specifically, as described below, the usage log data managed in terms of widget ID is converted to the converted usage log data that can be managed in terms of function ID. With this conversion, a log of functions executed at the image forming apparatus 10 can be compared between the time before the widget is being installed and the time after the widget is being installed.

At S41, in order to analyze log information for a specific image forming apparatus 10, the memory control 59 of the widget log management system 50 uses a specific device ID of the specific image forming apparatus 10 to read out all entries of usage log data that corresponds to the specific device ID of the image forming apparatus 10 for a predetermined time period, from the usage log memory 5001. The time period subjected for analysis may be set based on the average date/time on which the widget is installed on to the user terminal 20 of the customer. For example, it is assumed that the predetermined time period is set to a time period in which the usage date/time is between Jan. 1, 2012 and Jan. 31, 2012, and that a specific device ID is set to "A001". In such case, the memory control 59 uses the usage data/time that falls in a specific range between Jan. 1, 2012 and Jan. 31, 2012, and the device ID "A001", as a search key to read out data entries of the usage log data from the usage log memory 5001.

Based on the obtained data entries of the usage log data, the determiner 52 counts a number of different terminal IDs each indicating a specific user terminal 20, which has requested the image forming apparatus 10 "A001" to perform specific functions using the widget as described above referring to S23 of FIG. 12. More specifically, the determiner 52 determines a total number of different user terminals 20 each of which requested the image forming apparatus 10 to perform specific functions using the widget. The number of different user terminals 20 may be expressed as "α". For example, if there are more than one data entry of the usage log data for the same user terminal 20 having the same terminal ID, the determiner 52 counts a number of user terminal 20 as one.

At S42, the memory control 59 searches the estimated terminal number manager 5002 (the estimated terminal number table of FIG. 7) using the specific device ID of the image forming apparatus 10 that is used at S41 to read out an estimated number of terminals that are predicted to be connected to the image forming apparatus 10 having the specific device ID. For example, assuming that the device ID of the image forming apparatus 10 is "A001", the memory control 59 reads out the estimated terminal number "14", which is stored in association with the device ID "A001", from the estimated terminal number management table of FIG. 7.

At S43, the determiner 52 compares the number of different user terminals 20 "α", which is obtained at S42, with 80% of the estimated terminal number obtained at S42 (expressed as "β"). Alternatively, the value β may be set to any number between 80% to 100%.

At S44, the determiner 52 determines whether the value α is equal to or greater than the value β. When it is determined that the value α is equal to or greater than the value β ("YES" at S44), the operation proceeds to S45. At S45, the widget log management system 50 determines to start analysis of the execution log data and the usage log data. When it is determined that the value α is less than the value β ("NO" at S44), the operation ends without performing analysis.

The above-described S43 and S44 are performed to improve the accuracy in generating an analysis result that is useful. More specifically, information regarding the usage of each widget is stored in the usage log memory 2001 of the user terminal 20, as described above referring to FIG. 11, only if the user agrees to provide such information to the services provider. For example, at the time of installing the widget manager or the widget, the user is asked whether the user agrees to provide widget usage log data to the services provider. Only when the user agrees, for example, by pressing the "YES" or "I agree" button, the services provider is able to collect the widget usage log data using the log management system 30. If the number of users who do not agree to provide the widget usage log data is relatively large with respect to a total number of employees, the accuracy in analysis using the collected usage log data tends to be low. In such case, the log management system 30 is not able to provide an analysis result that is useful to the customer.

In view of this, in this example, the widget log management system 50 determines to perform analysis of the usage log data, only when the number of users who agree to provide the widget usage log data is relatively large such that it is equal to or greater than 80% of the total number of employees who use the user terminals. More specifically, as described above referring to S43, the determiner 52 of the widget log management system 50 determines whether the value α indicating a number of users who agree to provide the usage log data is equal to or greater than the value β indicating 80% of the estimated terminal number. As described above, the estimated number of user terminals 10 is calculated as a product of the employee size of a customer and the penetration rate of terminals.

Referring back to FIG. 15, at S45, the memory control 59 of the widget log management system 50 searches the widget manager 5003 (the widget management table of FIG. 9) using the widget ID of the usage log data that is read at S41, to obtain one or more function IDs that correspond to the widget ID of the usage log data for each one of the widget IDs of the usage log data subjected for analysis. Referring to the widget management table of FIG. 9, for the widget ID "W003", the function ID "E001" and the function ID "E002" are obtained. More specifically, the widget log management system 50 converts the widget ID "W003" to the function IDs "E001" and "E002". With this conversion, the usage log data that is stored in the usage log memory 5001 and managed using a widget ID is converted to usage log data having a data format applicable to the execution log data that is stored in the execution log memory 4001 and managed using a function ID. The number of executed functions that are obtained by the image forming apparatus 10 (reflecting the functions executed without using the widget), and the number of executed functions that are obtained by the user terminal 20 (reflecting the functions executed using the widget) are easily compared with each other.

At S46, the memory control 59 searches the execution log memory 4001 to obtain data entries of the execution log data including the specific device ID, which is the same device ID included in the usage log data subjected for analysis, for a specific time period. Since this example is to generate an analysis result indicating the usage of the specific widget, the time period subjected for analysis of the execution log data is set before the average date/time on which the widget is installed onto the user terminal 20 of the customer.

For example, the memory control 59 may send a request including the specific device ID and the specific time period that are subjected for analysis through the data transmit/receive 51 to the device log management system 40. The memory control 49 of the device log management system 40, which receives the request through the data transmit/receive 41, extracts data entries of the execution log data that corresponds to the specific device ID and the specific time period, from the execution log data stored in the execution log memory 4001. The data transmit/receive 41 sends the obtained entries of the execution log data to the widget log management system 50.

The data transmit/receive 51 transmits the converted usage log data that is obtained at S45, and the execution log data that is obtained at S46, to the analyzing system 60 to request for analysis. The data transmit/receive 61 of the analyzing system 60 receives the converted usage log data and the execution log data, for the specific device ID.

At S46, in another example, the widget log management system 50 may cause the device log management system 40 to extract data entries of the execution log data for the specific device ID and to send the extracted execution log data directly through the analyzing system 60.

At S47, the analyzer 62 of the analyzing system 60 analyzes the converted usage log data and the execution log data. For example, the analyzer 62 compares a number of functions that are executed at the image forming apparatus 10 without using a specific widget, with a number of functions that are executed at the image forming apparatus 10 using the specific widget, to generate an analysis result. This analysis result may indicate comparison between a number of functions that are executed at the image forming apparatus 10 before the specific widget is installed, and a number of functions that are executed at the image forming apparatus 10 after the specific widget is installed.

At S48, the memory control 69 of the analyzing system 60 stores an analysis result generated at S47 in the analysis result memory 6001, and the operation ends.

Based on the analysis result, the services provider is able to determine whether the specific widget is frequently used by a specific customer. When the specific widget is frequently used, the services provider is able to propose to the other customers to use the specific widget.

In the above-described example of FIG. 15, it is assumed that the log management system 30 performs operation of analyzing the function execution log data and the widget usage log data to generate an analysis result, which indicates how frequently the widget is used to perform specific functions at the specific image forming apparatus 10, or whether the usage of specific widget increases the usage of specific functions. Alternatively, the log management system 30 may perform operation of analyzing any one of the usage log data and the execution log data in various other ways, depending on the purpose of analysis.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a log management system that manages a log of functions that are executed at an information processing apparatus. The log management system includes: program managing means for managing program identification information for identifying a program that requests the information processing apparatus to execute one or more functions, function identification information for identifying one or more functions to be executed at the information processing apparatus by the program in association with each other, the program being installed onto an information processing terminal that communicates with the information processing apparatus; receiving means for receiving program identification information for identifying a program that requests the information processing apparatus to execute one or more functions from the information processing terminal through a communication network, and receiving function identification information for identifying a function executed at the information processing apparatus from the information processing apparatus through the communication network; and obtaining means for searching the program managing means to obtain function identification information that is associated with the program identification information received by the receiving means.

For example, the program managing means corresponds to the widget manager 5003, which manages association data indicating the association between a widget ID of a widget and a function ID of each one of one or more functions to be executed by the widget. The widget manager 5003 may be implemented by one or more computers functioning as a database server, which includes a memory capable of storing data such as the widget management able of FIG. 9. Alternatively, the widget manager 5003 may be implemented by a memory such as the HD 204, or a removable memory such as the medium 204 or the CD-ROM 213. The receiving means corresponds to the data transmit/receive 41 and the data transmit/receive 51, each of which may be implemented by the network I/F 209 (FIG. 3). The obtaining means corresponds to the memory control 59, which may be implemented by, for example, the network I/F 209 (FIG. 3) that communicates with the other device, or the HDD 205 that accesses the HD 204. The obtaining means operates under control of a processor such as the CPU 201 that operates in cooperation with the control program stored in any desired memory such as the RAM 203.

In another example, the log management system further includes analyzing means for analyzing a log of functions that are executed at the information processing apparatus, based on the function identification information that is associated with the program identification information received by the receiving means, and the function identification information that is received from the information processing apparatus. For example, the analyzing means of the log management system analyzes a log of functions that are executed, based on one or more functions specified by the function identification information that is associated with the program identification information received by the receiving means and the function identification information that is received from the information processing apparatus.

For example, the analyzing means corresponds to the analyzer 62 of the analyzing system 60, which may be implemented by a processor such as the CPU 201 that operates in cooperation with the control program stored in any desired memory such as the RAM 203.

Further, in the log management system, the receiving means receives program usage information indicating a number of which the program specified by the program identification information is used. The receiving means further receives function execution log information indicating a number of which the function specified by the function identification information is executed. The obtaining means further converts the program usage information to converted function execution log information indicating a number of which each one of the one or more functions are executed at the information processing apparatus by the program specified by the program identification information.

The analyzing means compares a number of which a specific function is executed between the function log information that is received from the information processing apparatus and the converted function log information that is converted from the program usage information received from the information processing terminal, for each one of the functions that are specified by the function identification information received from the information processing apparatus and the function identification information that is associated with the program identification information received from the information processing terminal.

As described above, the log management system converts the program identification information that is received from the information processing terminal, to function identification information that identifies one or more functions to be executed at the information processing apparatus by a program specified by the program identification information. With this conversion, the log management system is able to compare between function execution log data that is managed using the function identification information, and program usage log data that is managed using the program identification information. For example, the log management system compares a number of which a specific function is executed that is obtained from the function execution log data, with a number of which the specific function is executed that is obtained from the program usage log data, to generate an analysis result. Based on this analysis result, the services provider is able to know how frequently a program, such as a widget, is used to execute one or more functions at the information processing apparatus.

In the log management system, the receiving means further receives first device identification information for identifying the information processing apparatus that executes one or more functions by the program specified by the program identification information, from the information processing terminal. The receiving means further receives second device identification information for identifying the information processing apparatus that transmits the function identification information from the information processing apparatus. The analyzing means analyzes a number of which a function is executed for each one of the functions specified by the function identification information received from the information processing apparatus and the function identification information that is converted from the program identification information received from the information processing terminal, for the information processing apparatus specified by the first device identification information and the second device identification information.

The log management system further includes estimated terminal number managing means for managing estimated terminal number information indicating a number of information processing terminals that are estimated to be connected to the information processing apparatus through the communication network in association with the first device identification information. The receiving means receives terminal identification information for identifying the information processing terminal on which the program is installed, with the first device identification information, from the information processing terminal. The obtaining means searches the estimated terminal number managing means to obtain the estimated terminal number information that is associated with the first device identification information that is received. The log management system further includes determining means for determining whether analysis by the analyzing means is to be performed based on a number of different information processing terminals that sends the program identification information and a number of information processing terminals indicated by the estimated terminal number information. The analyzing means analyzes the number of which the specific function is executed, when the determining means determines that analysis is to be performed.

The log management system calculates the estimated number of information processing terminals of the estimated terminal number information based on a penetration rate of an information processing terminal, which is previously determined based on an employee size of an organization that owns the information processing terminal.

In one example, the present invention may reside in a log management method of managing a log of functions that are executed at an information processing apparatus, performed by a log management system that includes program managing means for managing program identification information for identifying a program that requests the information processing apparatus to execute one or more functions, function identification information for identifying one or more functions to be executed at the information processing apparatus by the program in association with each other, the program being installed onto an information processing terminal that communicates with the information processing apparatus. The log management method includes: receiving program identification information for identifying a program that requests the information processing apparatus to execute one or more functions from the information processing terminal through a communication network; receiving function identification information for identifying a function executed at the information processing apparatus from the information processing apparatus through the communication network; and obtaining means for searching the program managing means to obtain function identification information that is associated with the program identification information received by the receiving step.

In one example, the present invention may reside in a recording medium storing a plurality of instructions, which causes a computer to perform any one of the above-described operations.

In one example, the present invention may reside in a maintenance system that manages the log management system.

In one example, the present invention may reside in: a widget log management system connected to an information processing terminal and an information processing apparatus through a network. The widget log management system includes: a memory configured to store association data indicating association between program identification information for identifying a program that requests execution of one or more functions at the information processing apparatus, and function identification information for identifying each one of the one or more functions to be executed by the program; a first network interface configured to receive program identification information for identifying a program that requests the information processing apparatus to execute one or more functions, from the information processing terminal on which the program is installed through the network; and a processor configured to obtain function identification information that is associated with the program identification information received from the information processing terminal using the association data.

For example, the program identification information may be implemented by a widget ID, which uniquely identifies a widget. The function identification information may be implemented by a function ID, which uniquely identifies a function of the information processing apparatus. In one example, the information processing apparatus may be implemented by any desired image forming apparatus, and the information processing terminal may be implemented by any desired user terminal.

The widget log management system is connected to a device log management system through the network. The device log management system receives function identification information for identifying a function that is executed at the information processing apparatus, and function execution log information indicating a number of which the function is executed at the information processing apparatus, from the information processing apparatus through the network; and stores the function identification information and the function execution log information in a memory in association with each other.

The widget log management system further obtains, from the memory of the device log management system, function execution log information indicating a number of which each one of the one or more functions is executed, for the one or more functions that are specified by the function identification information that is associated with the program identification information received from the information processing terminal. The widget log management system is further connected to an analyzing system to which the function execution log data that is obtained from the memory and the converted program usage information that is converted from the program usage information received from the information processing terminal are transmitted. The analyzing system compares between the function execution log information that is obtained from the memory and the converted program usage information that is converted from the program usage information received from the information processing terminal to generate an analysis result indicating the usage of the program installed on the information processing terminal in executing one or more functions.

What is claimed is:

1. A log management system connected to an information processing terminal and an information processing apparatus through a network, the log management system comprising:

a memory configured to store association data indicating association between program identification information for identifying a program that requests execution of one or more functions at the information processing apparatus, and function identification information for identifying each one of the one or more functions to be executed by the program;

a first network interface configured to receive program identification information for identifying a program that requests the information processing apparatus to execute one or more functions, from the information processing terminal on which the program is installed through the network; and a processor configured to obtain function identification information that is associated with the program identification information received from the information processing terminal using the association data.

2. The log management system of claim 1, wherein:

the first network interface is further configured to receive program usage information indicating a number of times which the program is used to request the information processing apparatus to execute one or more functions, from the information processing terminal through the network, and the processor is further configured to convert the program usage information that is received from the information processing terminal, to converted program usage information indicating a number of times which each one of the one or more functions is executed at the information processing apparatus by the program specified by the program identification information that is received from the information processing terminal.

3. The log management system of claim 2, further comprising:

a second network interface configured to receive function identification information for identifying a function that is executed at the information processing apparatus, and function execution log information indicating a number of times which the function is executed at the information processing apparatus, from the information processing apparatus through the network, wherein the function identification information and the function execution log information are stored in the memory in association with each other.

4. The log management system of claim 3, wherein the processor is further configured to:

obtain, from the memory, function execution log information indicating a number of times which each one of the one or more functions is executed, for the one or more functions that are specified by the function identification information that is associated with the program identification information received from the information processing terminal; and compare between the function execution log information that is obtained from the memory and the converted program usage information that is converted from the program usage information received from the information processing terminal to generate an analysis result indicating the usage of the program installed on the information processing terminal in executing one or more functions.

5. The log management system of claim 4, wherein:

the first network interface is further configured to receive device identification information for identifying the information processing apparatus that is requested by the program specified by the program identification information to execute one or more functions;

the second network interface is further configured to receive device identification information for identifying the information processing apparatus that transmits the function identification information, wherein the device identification information is stored in the memory in association with the function identification information and the function execution log information; and the processor is further configured to compare between the function execution log information and the converted program usage information that are respectively obtained for the information processing apparatus requested by the program specified by the program identification information received from the information processing terminal, to generate the analysis result indicating the usage of the program installed on the information processing terminal in executing one or more functions for the information processing apparatus requested by the program.

6. The log management system of claim 5, wherein the memory is further configured to store, for each one of a plurality of information processing apparatuses, estimated terminal number information indicating an estimated number of information processing terminals that are estimated to be connected to the information processing apparatus, in association with device identification information of the information processing apparatus, and the processor is further configured to:
obtain estimated terminal number information that is associated with the device identification information of the information processing apparatus requested by the program;
obtain a number of different information processing terminals that send the program identification information and the program usage information to the information processing apparatus requested by the program; and
determine whether to generate the analysis result for the information processing apparatus requested by the program, based on the obtained estimated terminal number information and the obtained number of different information processing terminals.

7. The log management system of claim 6, wherein the processor is further configured to calculate, for each one of the plurality of information processing apparatuses, the estimated number of information processing terminals based on a penetration rate of the information processing terminal for users who use the information processing apparatus, and a number of the users.

8. An information processing system, comprising:
the log management system of claim 1;
the information processing apparatus connected to the log management system through the network; and
the information processing terminal connected to the log management system through the network.

9. A log management method, comprising:
storing in a memory association data indicating association between program identification information for identifying a program that requests execution of one or more functions at an information processing apparatus, and function identification information for identifying each one of the one or more functions to be executed by the program;
receiving program identification information for identifying a program that requests the information processing apparatus to execute one or more functions, from an information processing terminal on which the program is installed through a network; and
obtaining function identification information that is associated with the program specified by the program identification information received from the information processing terminal using the association data.

10. The method of claim 9, further comprising:
receiving program usage information indicating a number of times which the program is used to request the information processing apparatus to execute one or more functions, from the information processing terminal through the network; and
converting the program usage information that is received from the information processing terminal, to converted function log information indicating a number of times which each one of the one or more functions are executed at the information processing apparatus by the program specified by the program identification information that is received from the information processing terminal.

11. The method of claim 10, further comprising:
receiving program usage information indicating a number of times which the program is used to request the information processing apparatus to execute one or more functions, from the information processing terminal through the network; and
converting the program usage information that is received from the information processing terminal, to converted program usage information indicating a number of times which each one of the one or more functions is executed at the information processing apparatus by the program specified by the program identification information that is received from the information processing terminal.

12. The method of claim 11, further comprising:
obtaining, from the memory, function execution log information indicating a number of times which each one of the one or more functions is executed, for the one or more functions that are specified by the function identification information that is associated with the program identification information received from the information processing terminal; and
comparing between the function execution log information that is obtained from the memory and the converted program usage information that is converted from the program usage information received from the information processing terminal to generate an analysis result indicating the usage of the program installed on the information processing terminal in executing one or more functions.

13. The method of claim 12, further comprising:
receiving device identification information for identifying the information processing apparatus that is requested by the program specified by the program identification information to execute one or more functions;
receiving device identification information for identifying the information processing apparatus that transmits the function identification information, wherein the device identification information is stored in the memory in association with the function identification information and the function execution log information; and
comparing between the function execution log information and the converted program usage information that are respectively obtained for the information processing apparatus requested by the program specified by the program identification information received from the information processing terminal, to generate the analysis result indicating the usage of the program installed on the information processing terminal in executing one or more functions for the information processing apparatus requested by the program.

14. The method of claim 13, further comprising:
storing in the memory, for each one of a plurality of information processing apparatuses, estimated terminal number information indicating an estimated number of information processing terminals that are estimated to be connected to the information processing apparatus, in association with device identification information of the information processing apparatus;
obtaining estimated terminal number information that is associated with the device identification information of the information processing apparatus requested by the program;
obtaining a number of different information processing terminals that send the program identification information and the program usage information to the information processing apparatus requested by the program; and
determining whether to generate the analysis result for the information processing apparatus requested by the program, based on the obtained estimated terminal number information and the obtained number of different information processing terminals.

15. A non-transitory computer-readable recording medium storing a plurality of instructions which, when executed by a processor, cause the processor to perform a log management method comprising:
storing in a memory association data indicating association between program identification information for identifying a program that requests execution of one or more functions at an information processing apparatus, and function identification information for identifying each one of the one or more functions to be executed by the program;
receiving program identification information for identifying a program that requests the information processing apparatus to execute one or more functions, from an information processing terminal on which the program is installed through a network; and
obtaining function identification information that is associated with the program specified by the program identification information received from the information processing terminal using the association data.

* * * * *